(12) United States Patent
Bath et al.

(10) Patent No.: US 9,417,975 B2
(45) Date of Patent: Aug. 16, 2016

(54) FAILOVER FUNCTIONALITY FOR CLIENT-RELATED SECURITY ASSOCIATION

(75) Inventors: Michael Bath, Berlin (DE); Wolfgang Buecker, Neubiberg (DE); Peter Bader, Hohenbrunn (DE); Jiadong Shen, Münich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 141 days.

(21) Appl. No.: 14/395,844

(22) PCT Filed: Apr. 23, 2012

(86) PCT No.: PCT/EP2012/057367
§ 371 (c)(1),
(2), (4) Date: Dec. 18, 2014

(87) PCT Pub. No.: WO2013/159804
PCT Pub. Date: Oct. 31, 2013

(65) Prior Publication Data
US 2015/0121123 A1    Apr. 30, 2015

(51) Int. Cl.
| | | |
|---|---|---|
| G06F 11/00 | (2006.01) | |
| G06F 11/20 | (2006.01) | |
| H04L 29/06 | (2006.01) | |
| H04L 29/08 | (2006.01) | |
| H04L 29/14 | (2006.01) | |
| G06F 9/50 | (2006.01) | |

(52) U.S. Cl.
CPC .......... *G06F 11/2023* (2013.01); *G06F 9/5083* (2013.01); *H04L 63/08* (2013.01); *H04L 63/166* (2013.01); *H04L 65/1016* (2013.01); *H04L 67/28* (2013.01); *H04L 69/40* (2013.01); *H04L 67/1029* (2013.01); *H04L 67/1034* (2013.01); *H04L 67/1036* (2013.01)

(58) Field of Classification Search
USPC .................................. 714/4.11, 4.1
See application file for complete search history.

(56) References Cited

U.S. PATENT DOCUMENTS

| | | | | |
|---|---|---|---|---|
| 7,543,182 B2* | 6/2009 | Branda | .................. | G06F 9/4856 714/15 |
| 2010/0293043 A1* | 11/2010 | Atreya | ................ | G06F 11/2023 705/14.4 |
| 2012/0042084 A1 | 2/2012 | Dutta et al. | | |
| 2015/0304235 A1* | 10/2015 | Reynolds | ................ | H04L 45/74 714/4.11 |

FOREIGN PATENT DOCUMENTS

WO    WO 2007/113073 A1    10/2007

OTHER PUBLICATIONS

International Search Report and Written Opinion dated Jan. 28, 2013 corresponding to International Patent Application No. PCT/EP2012/057367.

* cited by examiner

*Primary Examiner* — Sarai Butler
(74) *Attorney, Agent, or Firm* — Squire Patton Boggs (US) LLP (57) ABSTRACT

There are provided measures for a failover functionality for a client-related security association. Such measures exemplarily comprise providing a failover functionality at a proxy function and/or facilitating provision of a failover functionality at a servicing call state control function, wherein the respective failover functionality relates to a first proxy function, the serving function is for servicing the first proxy function and a second proxy function, the first proxy function has a security association with a client, and the first proxy function and the second proxy function are reachable with the same network address.

28 Claims, 6 Drawing Sheets

FAILOVER FUNCTIONALITY FOR CLIENT-RELATED SECURITY ASSOCIATION

FIELD

The present invention relates to a failover functionality for a client-related security association. More specifically, the present invention exemplarily relates to measures (including methods, apparatuses and computer program products) for realizing a failover functionality for a client-related security association.

BACKGROUND

In modern communication systems, including both mobile and fixed networks, which are typically IP based, client authentication is often realized via a client-related security association between the client and a specific network element. Accordingly, problems in terms of authentication and, thus, problems in terms of communication relying on a preceding authentication could arise in case of a failure of the specific network element resulting in the failure of the security association.

In the following, reference is mainly made to 3GPP mobile networks for illustrative and explanatory purposes so as to exemplify the aforementioned circumstances. It is to be noted that, while reference is mainly made to 3GPP mobile networks hereinafter, such reference is made by way of example only, and similar considerations equally apply to other types of mobile networks and/or fixed networks accordingly.

For example, in IMS- or other SIP-based networks, the SIP protocol is used for session handling. The SIP protocol defines the procedure of registration, which is the linking of the local transport address (e.g. IP address and port) of a client with the publicly known address-of-record (called "public identity" in IMS) of the client. In the IMS, the aspect of authentication is additionally connected with the registration procedure. For authentication, the IMS AKA authentication method is defined, which uses an IPSec connection between the client and a P-CSCF representing the specific network element in charge of authentication. On the IPSec connection, IPSec security associations (SA) are created at the time of registration and refreshed at the time of re-registration.

When a client is authenticated via the IMS AKA authentication method, the client can only send and receive SIP messages via the corresponding security associations (SA) via which it is authenticated at the network side. When the SA is not available anymore, e.g. due to failure of the specific network element in charge of authentication such as the P-CSCF, the client is not reachable by the network. According to previously proposed solutions, the client as such has to perform a new registration by itself, which new registration is to take place via an alternative network element in charge of authentication such as an alternative P-CSCF, before the alternative P-CSCF or the like can send and receive any message with respect to the client. The new registration by the client as such may be triggered by an unsuccessful attempt of a connection establishment or at least a re-registration by the client itself. That means that, within a re-/registration period (which may range from e.g. half an hour to several days), the client is not reachable by the network, which is an unacceptable amount of time.

Accordingly, it is desirable to avoid such unacceptably long service interruption in case of a failure of a network element in charge of authentication via a client-related security association.

That is to say, it is desirable to provide for an improved failover functionality for a client-related security association.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising providing a failover functionality for a first proxy function in cooperation with a serving function configured for servicing the first proxy function and a second proxy function, wherein the first proxy function has a security association with a client, and the first proxy function and the second proxy function are reachable with the same network address, wherein providing the failover functionality comprises sending data of the security association or data of the security association together with data of a registration of the client from the first proxy function to the serving function upon registering or re-registering the client at the first proxy function.

According to an exemplary aspect of the present invention, there is provided a method, comprising providing a failover functionality for a first proxy function in cooperation with a serving function configured for servicing the first proxy function and a second proxy function, wherein the first proxy function has a security association with a client, and the first proxy function and the second proxy function are reachable with the same network address, wherein providing the failover functionality comprises receiving data of the security association or data of the security association together with data of a registration of the client from the serving function at the second proxy function, and creating an alternative security association between the second proxy function and the client on the basis of the received data.

According to an exemplary aspect of the present invention, there is provided a method comprising facilitating provision of a failover functionality for a first proxy function in cooperation with the first proxy function and a second proxy function at a serving function configured for servicing the first proxy function and the second proxy function, wherein the first proxy function has a security association with a client, and the first proxy function and the second proxy function are reachable with the same network address, wherein facilitating provision of the failover functionality comprises receiving data of the security association or data of the security association together with data of a registration of the client from the first proxy function at the serving function, and storing the received data for a registration period of the client.

According to an exemplary aspect of the present invention, there is provided an apparatus comprising an interface configured to communicate with at least another apparatus, a memory configured to store computer program code, and a processor configured to cause the apparatus to perform: providing a failover functionality for a first proxy function in cooperation with a serving function configured for servicing the first proxy function and a second proxy function, wherein the first proxy function has a security association with a client, and the first proxy function and the second proxy function are reachable with the same network address, wherein the processor is configured to cause the apparatus to perform for providing the failover functionality: sending data of the security association or data of the security association together with data of a registration of the client to the serving function upon registering or re-registering the client at the first proxy function.

According to an exemplary aspect of the present invention, there is provided an apparatus comprising an interface configured to communicate with at least another apparatus, a memory configured to store computer program code, and a processor configured to cause the apparatus to perform: providing a failover functionality for a first proxy function in cooperation with a serving function configured for servicing the first proxy function and a second proxy function, wherein the first proxy function has a security association with a client, and the first proxy function and the second proxy function are reachable with the same network address, wherein the processor is configured to cause the apparatus to perform for providing the failover functionality: receiving data of the security association or data of the security association together with data of a registration of the client from the serving function, and creating an alternative security association with the client on the basis of the received data.

According to an exemplary aspect of the present invention, there is provided an apparatus comprising an interface configured to communicate with at least another apparatus, a memory configured to store computer program code, and a processor configured to cause the apparatus to perform: facilitating provision of a failover functionality for a first proxy function in cooperation with the first proxy function and a second proxy function at a serving function configured for servicing the first proxy function and the second proxy function, wherein the first proxy function has a security association with a client, and the first proxy function and the second proxy function are reachable with the same network address, wherein the processor is configured to cause the apparatus to perform for facilitating provision of the failover functionality: receiving data of the security association or data of the security association together with data of a registration of the client from the first proxy function, and storing the received data for a registration period of the client.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

The computer program product may comprise or may be embodied as a (tangible) computer-readable (storage) medium or the like on which the computer-executable computer program code is stored, and/or the program is directly loadable into an internal memory of the computer or a processor thereof.

Advantageous further developments or modifications of the aforementioned exemplary aspects of the present invention are set out in the following.

By way of exemplary embodiments of the present invention, there is provided a failover functionality for a client-related security association.

Any one of the above aspects enables improving the failover functionality for a client-related security association in terms of response time, i.e. the duration of service interruption after failure of a network element in charge of authentication via a client-related security association.

Thus, improvement is achieved by methods, apparatuses and computer program products enabling/realizing a failover functionality for a client-related security association.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. For example, IMS- or SIP-based networks are used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, the present invention and its embodiments may be applicable in any fixed or mobile communication system and/or network deployment in which client authentication is realized via a client-related security association between the client and a specific network element.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) a failover functionality for a client-related security association.

The failover functionality for a client-related security association according to exemplary embodiments of the present invention is realized at least one proxy function such as a proxy call state control function (P-CSCF) and/or a serving function such as a serving call state control function (S-CSCF). The failover functionality relates to a first proxy (call state control) function, the serving (call state control) function is for servicing the first proxy (call state control) function and at least one second proxy (call state control) function, the first proxy (call state control) function has (or is involved in) a security association (SA) with a client, and the first proxy (call state control) function and the at least one second proxy (call state control) function are reachable with (or exhibit) the same network address (e.g. IP address). The at least one proxy (call state control) function according to exemplary embodiments of the present invention, i.e. the first and/or second proxy (call state control) function, provides the failover functionality, and/or the serving (call state control) function according to exemplary embodiments of the present invention facilitates provision of the failover functionality.

In the following, for the sake of lucidity, a P-CSCF 1 is adopted as a non-limiting example of the first proxy function according to exemplary embodiments of the present invention, a P-CSCF 2 is adopted as a non-limiting example of the second proxy function according to exemplary embodiments of the present invention, and a S-CSCF is adopted as a non-limiting example of the serving function according to exemplary embodiments of the present invention.

Figure 1:
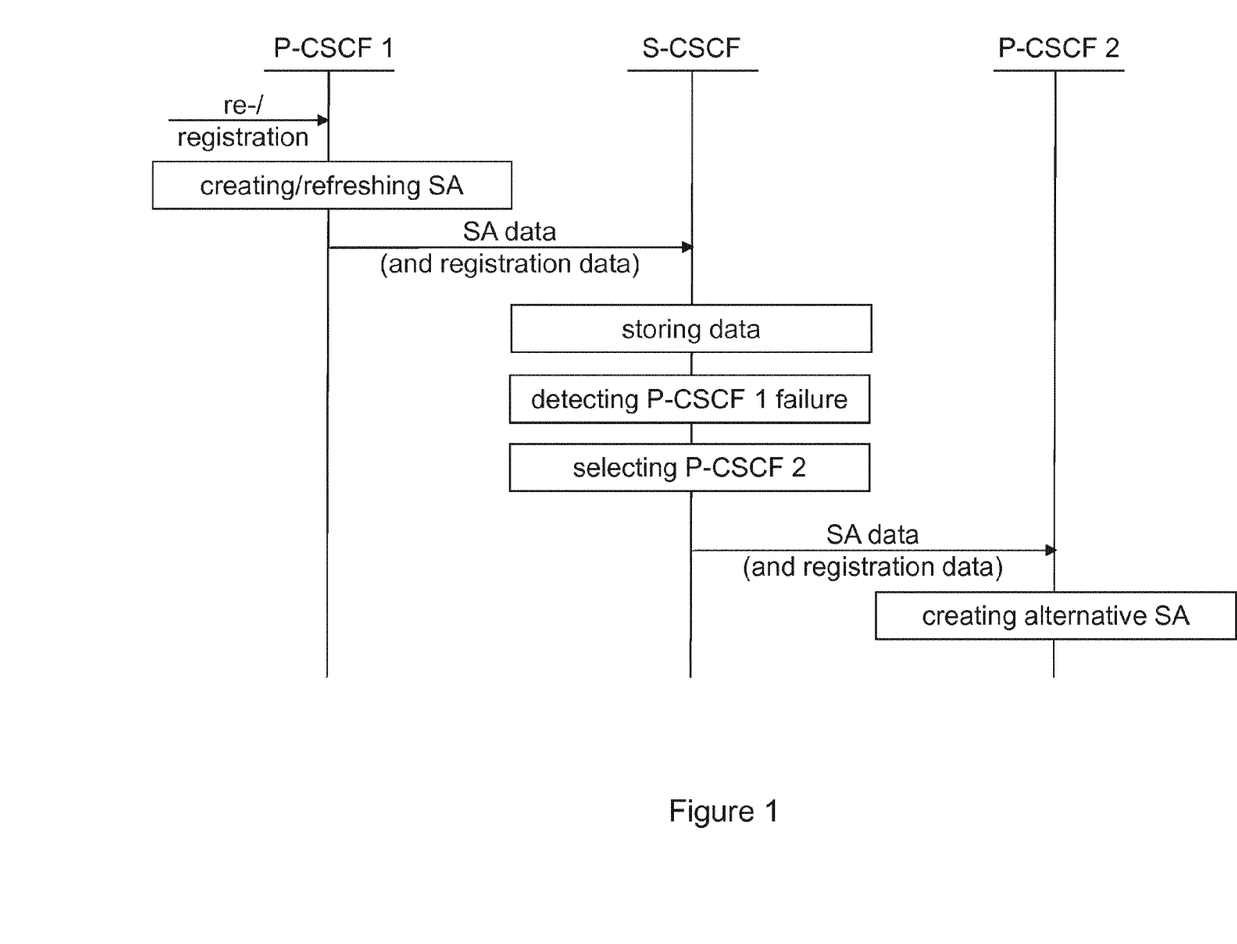
FIG. 1 shows a schematic diagram of a procedure according to exemplary embodiments of the present invention.

FIG. 1 shows a schematic diagram of a procedure according to exemplary embodiments of the present invention.

In the procedure of FIG. 1, it is assumed that a client (not shown) is to be authenticated by the IMS AKA authentication method at the P-CSCF 1, wherein the authentication is accomplished via a security association (SA) on an IPSec connection. From the view point of the client, both P-CSCF 1 and P-CSCF 2 can be reached using the same network address (e.g. IP address). This may for example be realized by using a load balancer (not shown in the figure) being placed between the client and both P-CSCFs.—The S-CSCF is a network element servicing both P-CSCF 1 and P-CSCF 2.

As shown in FIG. 1, the SA is created or refreshed at the P-CSCF 1 at the time of registration or re-registration of the client at the P-CSCF 1. Accordingly, data (e.g. algorithms, SPI, key, IP addresses, ports, mode, etc.) are stored for the SA, i.e. the respective registration period thereof, at the P-CSCF 1. Upon registration or re-registration of the client at the P-CSCF 1, the P-CSCF 1 sends the SA data (possibly together with registration data), which is locally stored as well, to the S-CSCF. Namely, the P-CSCF 1 provides all necessary SA data towards the servicing network element, where this data is stored/updated for the current registration period, at the time of registration or re-registration. As outlined below, the SA data (possibly together with registration data) may be carried in a registration message and/or a SIP message or a header (e.g. a proprietary dedicated header or one or more proprietary dedicated parameters within a standardized SIP header) thereof. Thereby, a failover functionality for the P-CSCF 1 (or its security association with the client) is provided at/by the P-CSCF 1.

As shown in FIG. 1, the S-CSCF receives the SA data (possibly together with registration data) from the P-CSCF 1, and the S-CSCF then stores (i.e. newly stores or updates previously stored data by) the received data for the current registration period. When the S-CSCF detects a failure of the P-CSCF 1, the S-CSCF selects the P-CSCF 2 as a failover P-CSCF for the failed P-CSCF 1, and sends the received (and locally stored) data, i.e. the SA data (possibly together with registration data) received from the P-CSCF 1, to the P-CSCF 2. That is to say, the S-CSCF is capable of recognizing that the P-CSCF 1 (assigned in the registration data of the client) is not available anymore, which may for example be realized by any availability monitoring technique. Further, the S-CSCF is capable of selecting an appropriate failover function or network element for the failed P-CSCF 1, i.e. recognizing that the P-CSCF 2 can be chosen as failover P-CSCF e.g. for a current terminating session to be handled, which may for example be realized on the basis of configuration data. Namely, the S-CSCF provides all necessary SA data towards the failover network element, where this data is used for failover purposes, at the time of detection of a P-CSCF 1 failure. As outlined below, the SA data (possibly together with registration data) may be carried in a request message and/or a SIP message or a header (e.g. a proprietary dedicated header or one or more proprietary dedicated parameters within a standardized header) thereof. Thereby, provision of a failover functionality for the P-CSCF 1 (or its security association with the client) is facilitated at/by the S-CSCF.

As shown in FIG. 1, the P-CSCF 2 receives the SA data (possibly together with registration data) from the S-CSCF, and the P-CSCF 2 creates an alternative SA with the client (not shown) on the basis of the received data, wherein the alternative SA replaces the SA between the P-CSCF 1 and the client. In this regard, the P-CSCF 2 stores (i.e. newly stores or updates previously stored data by) the received data for the current registration period, and uses at least the SA data in order to locally create a new SA for the previous SA of the failed P-CSCF. As outlined below, the SA data (possibly together with registration data) may be carried in a request message and/or a SIP message or a header (e.g. a proprietary dedicated header or one or more proprietary dedicated parameters within a standardized SIP header) thereof. Thereby, a failover functionality for the P-CSCF 1 (or its security association with the client) is provided at/by the P-CSCF 2.

The SA data as referred to herein may be static data, dynamic data, or a mixture between static and dynamic data.

According to exemplary embodiments of the present invention, a failover functionality for the SA (or the P-CSCF involved in the SA) is realized in that all necessary SA data is provided to an alternative P-CSCF (not coupled, grouped, clustered, or synchronized with the fail-safe P-CSCF) via, i.e. by help/cooperation or relaying of, the S-CSCF, as needed. Accordingly, it is beneficial that the two P-CSCFs as such do not need to be coordinated and/or communicate (between each other) in any way in terms of failover mechanisms according to exemplary embodiments of the present invention.

According to exemplary embodiments of the present invention, both the fail-safe P-CSCF, i.e. P-CSCF 1 in FIG. 1, and the failover P-CSCF, i.e. P-CSCF 2 in FIG. 1, are reachable with the same network address (e.g. IP address), namely both P-CSCFs exhibit the same network address (e.g. IP address) with respect to (i.e. from the view point of) the client. That is, both P-CSCFs listen to the same network address (e.g. IP address) and use the same network address (e.g. IP address) in conjunction with a security association and/or secured connection with the client. As outlined below, this may for example be realized by using a load balancer being placed between the client and both P-CSCFs, which does not change the thus relayed messages such as IP packets. Thereby, as the P-CSCF address is part of the SA, it can be re-used at another P-CSCF (i.e. for another SA), since the network address (e.g. IP address) remains the same from the view point of the client.

According to exemplary embodiments of the present invention, sending of SA data (possibly together with registration data) between functions or network nodes, e.g. between P-CSCF 1 and S-CSCF and/or between S-CSCF and P-CSCF 2 in FIG. 1) may be realized using encryption or not.

In the following, a procedure according to exemplary embodiments of the present invention is detailed with respect to a system architecture comprising an IMS- or SIP-based network, which comprises at least two P-CSCFs and a S-CSCF servicing both P-CSCFs, and a client, such as an IMS UE, being connected with the network.

In the system architecture used hereinafter by way of example, a load balancer is placed between the client and the network, i.e. between the client and both P-CSCFs (or even all P-CSCFs of the network), in order to provide a single entry/gateway/access point for the client (or even all clients connectable to the network) towards the network. Any client could thus only "see" a single (e.g. IP) endpoint for communication. The load balancer represents an example of a function or network element for realizing that both P-CSCFs are reachable with the same network address (e.g. IP address), namely both P-CSCFs appear with the same network address (e.g. IP address) with respect to (i.e. from the view point of) towards the client. In this regard, it could be said that the load balancer realizes a consolidated Gm interface or reference point.

In FIGS. 2 to 5 below, only relevant parts of the underlying system architecture, which may be involved in failover-related mechanisms according to exemplary embodiments of the present invention, are depicted. For example, a transport network and/or an access network between the client and the IMS- or SIP-based network is not illustrated for the sake of clarity.

Figure 2:
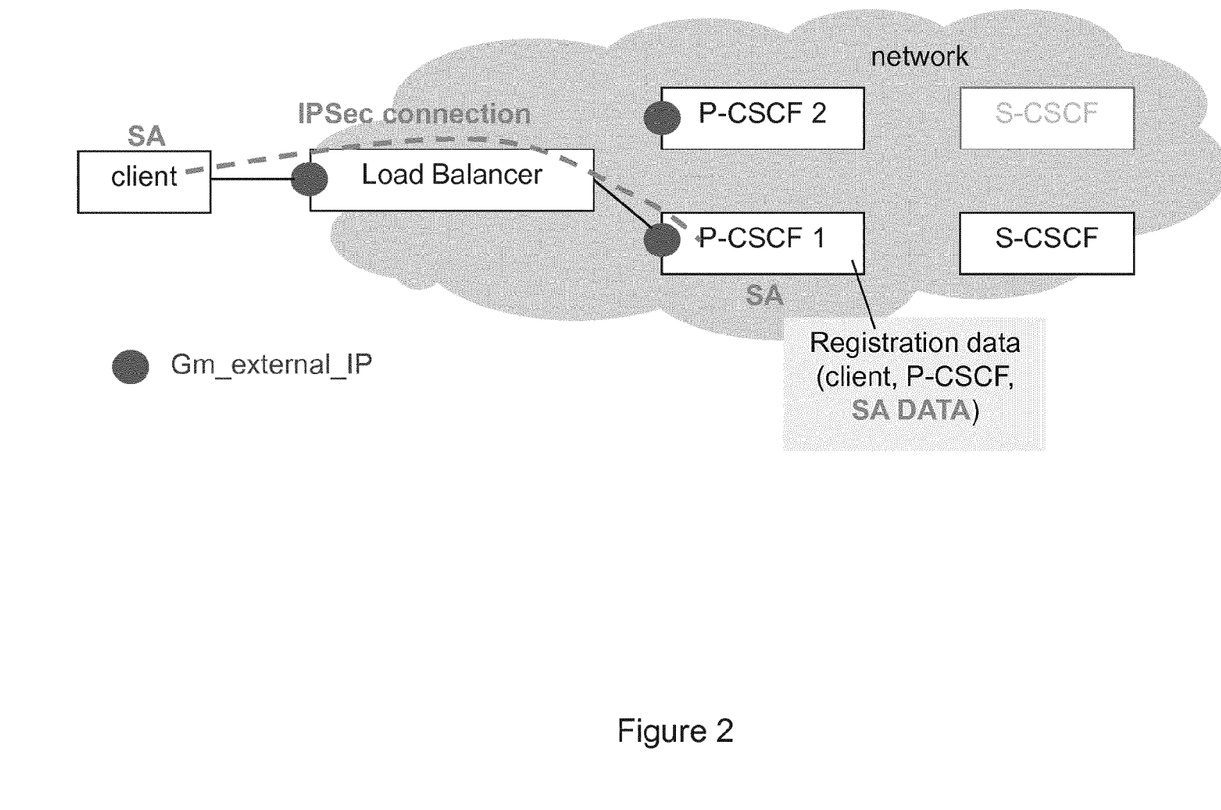
FIG. 2 shows a schematic diagram of a system scenario in connection with establishment of a secured connection for a security association in a procedure according to exemplary embodiments of the present invention.

FIG. 2 shows a schematic diagram of a system scenario in connection with establishment of a secured connection for a security association in a procedure according to exemplary embodiments of the present invention.

More specifically, FIG. 2 shows the situation when the client has established an IPSec connection towards the P-CSCF 1 for the purpose of IMS AKA authentication in a re-/registration process, and a SA (indicated by a dashed line) is present between the client and the P-CSCF 1. In the exemplary system scenario of FIG. 2, the IPSec connection is established via the load balancer, i.e. the load balancer does not terminate the IPSec connection (but is transparent for the SA), and the SA is available at the client and at the P-CSCF 1. The P-CSCF 1 stores the SA data about the security association (e.g. algorithms, SPI, key, IP addresses, ports, mode, . . . ).

As indicated in FIG. 2 by a dot at the load balancer, the P-CSCF 1 and the P-CSCF 2, the same IP address (hereinafter referred to as Gm_external_IP) is available at these three functions or network elements at the same time, as viewed from the client. The mechanism, how this may be achieved, is not a part of the present invention and its exemplary embodiments.

Figure 3:
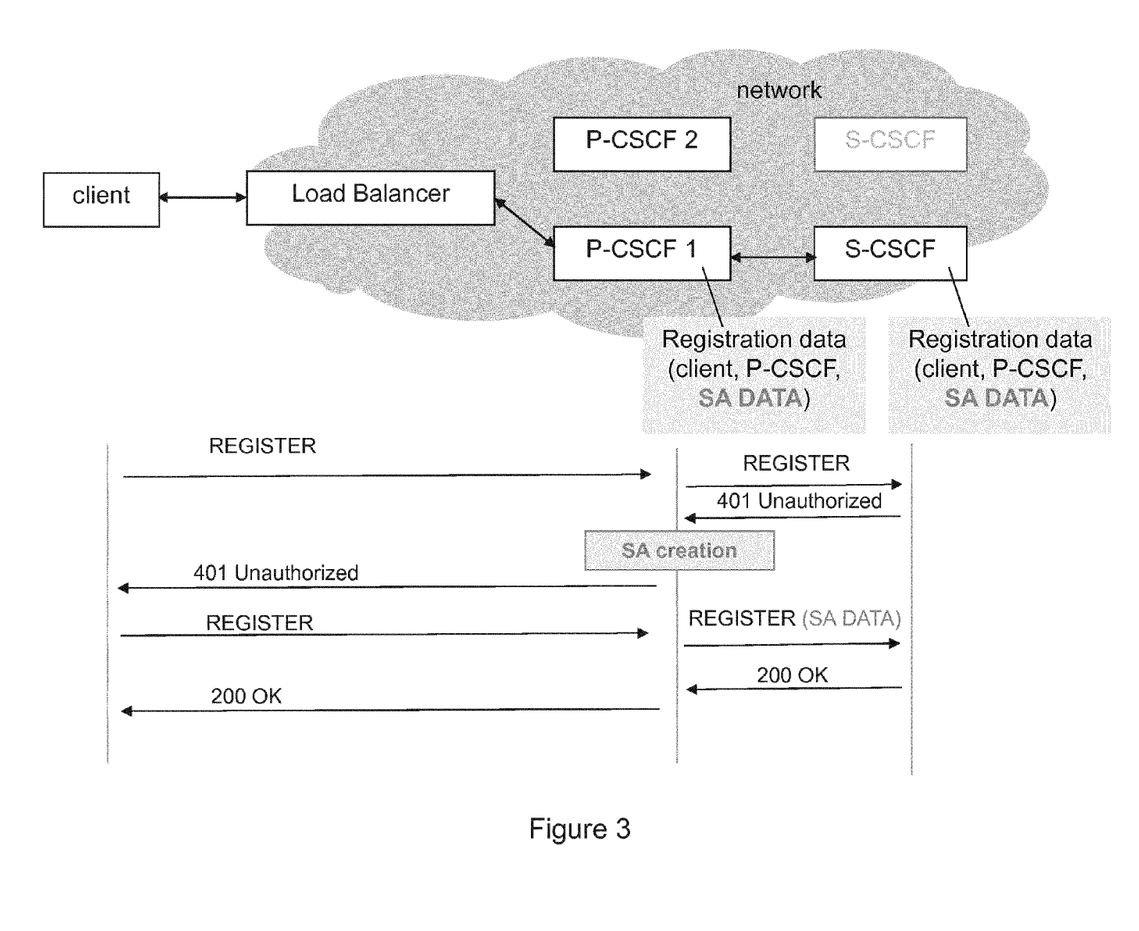
FIG. 3 shows a schematic diagram of a system scenario in connection with creation of a security association in a procedure according to exemplary embodiments of the present invention.

FIG. 3 shows a schematic diagram of a system scenario in connection with creation of a security association in a procedure according to exemplary embodiments of the present invention.

More specifically, FIG. 3 illustrates the principle of transporting the SA data from the P-CSCF 1 to the S-CSCF, where it is stored together with other data for this registration, upon re-/registration and/or SA creation/refreshing.

As shown in FIG. 3, the registration process may be initiated by a SIP REGISTER message, i.e. a registration message, from the client to the P-CSCF 1, where the SA is created in this example. The SIP REGISTER message, i.e. a registration message, from the client may be sent to and/or received at the P-CSCF 1 via the load balancer. Upon SA creation, when receiving again a SIP REGISTER message, i.e. a registration message, from the client, the P-CSCF 1 sends SA data of the thus created SA to the S-CSCF. This can for example be accomplished in any proprietary SIP header or by one or more proprietary parameters within any standardized SIP header, which the P-CSCF 1 and the S-CSCF understand. This header is removed, i.e. the SA data is extracted, by the S-CSCF before it is stored and/or sent to the P-CSCF 2 (see FIG. 4). During a re-registration process, the same or similar mechanisms can be used in order to update any SA data from the P-CSCF 1 to the S-CSCF.

Accordingly, the SA data about the security association (e.g. algorithms, SPI, key, IP addresses, ports, mode, . . . ) is not only stored at the P-CSCF, but also at the S-CSCF, while the S-CSCF does not handle any IPSec connection and/or SA as such.

Figure 4:
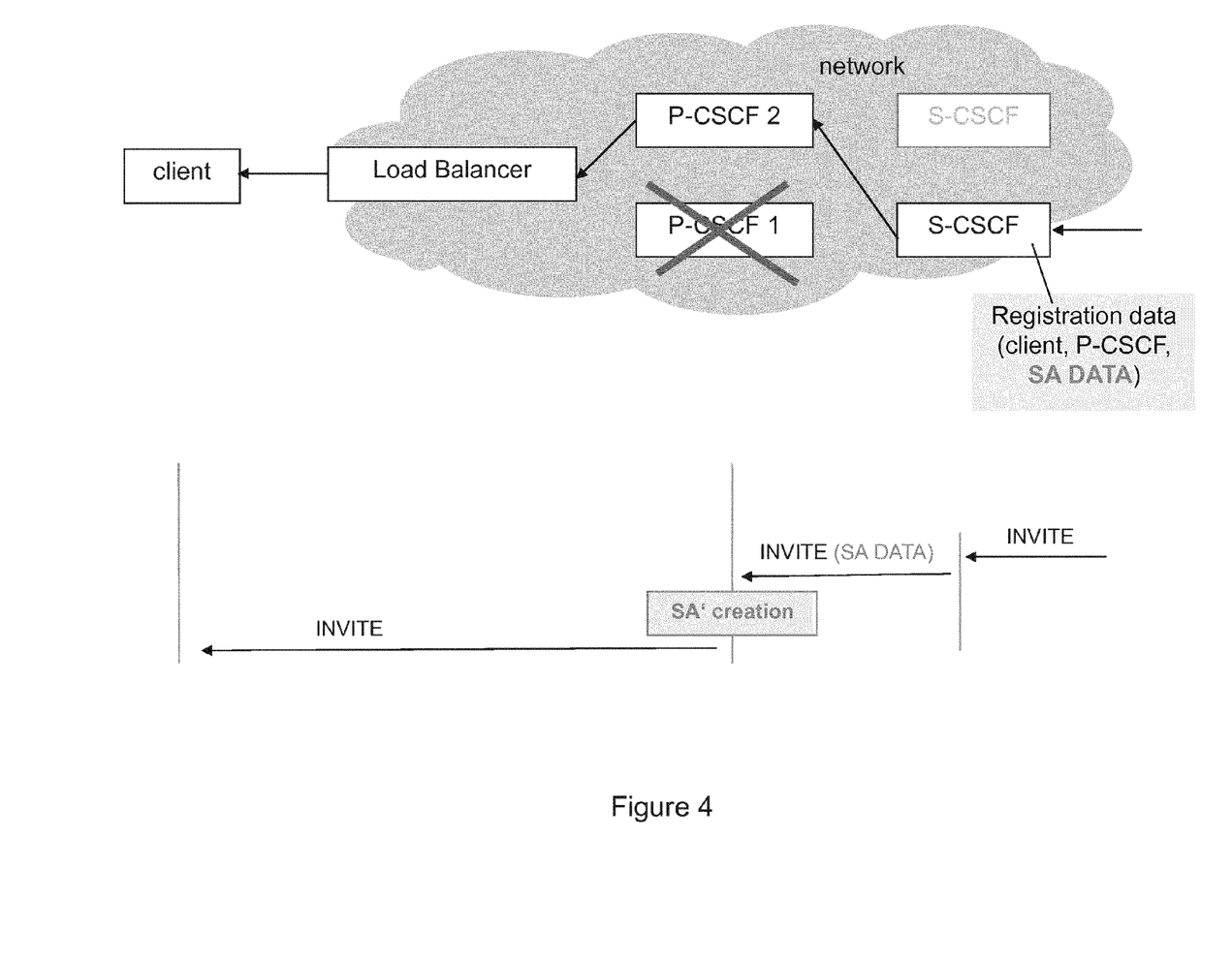
FIG. 4 shows a schematic diagram of a system scenario in connection with request handling in case of a failure relating to the security association in a procedure according to exemplary embodiments of the present invention.

FIG. 4 shows a schematic diagram of a system scenario in connection with request handling in case of a failure relating to the security association in a procedure according to exemplary embodiments of the present invention.

More specifically, FIG. 4 shows the situation when the P-CSCF has failed or crashed, and the S-CSCF performs a P-CSCF failover mechanism.

As shown in FIG. 4, the S-CSCF receives a terminating request (a SIP INVITE message in this example) destined for the client, which is thus to be passed to the registered client. In trying to pass the received terminating request via the P-CSCF 1, the S-CSCF recognizes that the P-CSCF1 (as-signed in the registration data of the destined client) is not available anymore. The S-CSCF knows that the P-CSCF 2 can be chosen as failover P-CSCF for this terminating session to be handled, e.g. from configuration data. Accordingly, the S-CSCF passes the terminating request to the failover P-CSCF 2 and adds the SA data for the previously existing security association between the destine client and the P-CSCF 1. This can for example be accomplished in any proprietary SIP header or by one or more proprietary parameters within any standardized SIP header, which the S-CSCF and the P-CSCF 1 understand. This header is removed, i.e. the SA data is extracted, by the P-CSCF 2 before it is used for SA creation and/or sent to the client (see FIG. 5). The P-CSCF 2 can use the SA data in order to locally create an alternative/failover SA (SA') to replace the previously existing SA with the client (via the load balancer). When the alternative/failover SA (SA') is successfully created, the terminating request can be sent via this newly created SA (SA') towards the client.

The SIP INVITE message, i.e. a request message, from the P-CSCF 2 may be sent to and/or received at the client via the load balancer.

As indicated in FIG. 4, the failure detection operation at/by the S-CSCF may be performed upon receiving a request message (e.g. a SIP INVITE message) destined for the client. In this case, the sending of the SA data by the S-CSCF and the receiving of the SA data by the P-CSCF 2 may be accomplished in connection with, i.e. may comprise sending and receiving of, a request (e.g. a SIP INVITE message) according to the request message received at the S-CSCF.

It is noted that the system scenario of FIG. 4 represents a non-limiting example for the case that the SA failure functionality according to exemplary embodiments of the present invention is triggered by receipt of a terminating request for the client at the S-CSCF. Yet, this is not a requirement for the applicability of the present invention. That is, the SA failure functionality according to exemplary embodiments of the present invention may be triggered by any event other than receipt of a terminating request for the client at the S-CSCF or may be executed (e.g. in an aperiodic or period manner) independent of any trigger such as e.g. receipt of a terminating request for the client at the S-CSCF.

For example, (e.g. all) stored SA data may be sent from the S-CSCF to the P-CSCF 2, e.g. by way of background process, before a terminating request is actually received and needs to be passed. The S-CSCF may recognize the outage of the P-CSCF 1 for the purpose of performing re-routing via the P-CSCF 2. For example, this recognition may be triggered by a terminating request of another subscriber (i.e. another transaction/session), any other explicit availability detection mechanism performed by the S-CSCF towards the P-CSCFs, or the like. One advantage of sending the stored SA data to the P-CSCF 2 in advance (i.e. before a terminating request of the subscriber in question is actually received) is that, in case a client initiates a session, the SA is already available in the P-CSCF 2 and therefore a new registration procedure can be avoided.

Figure 5:
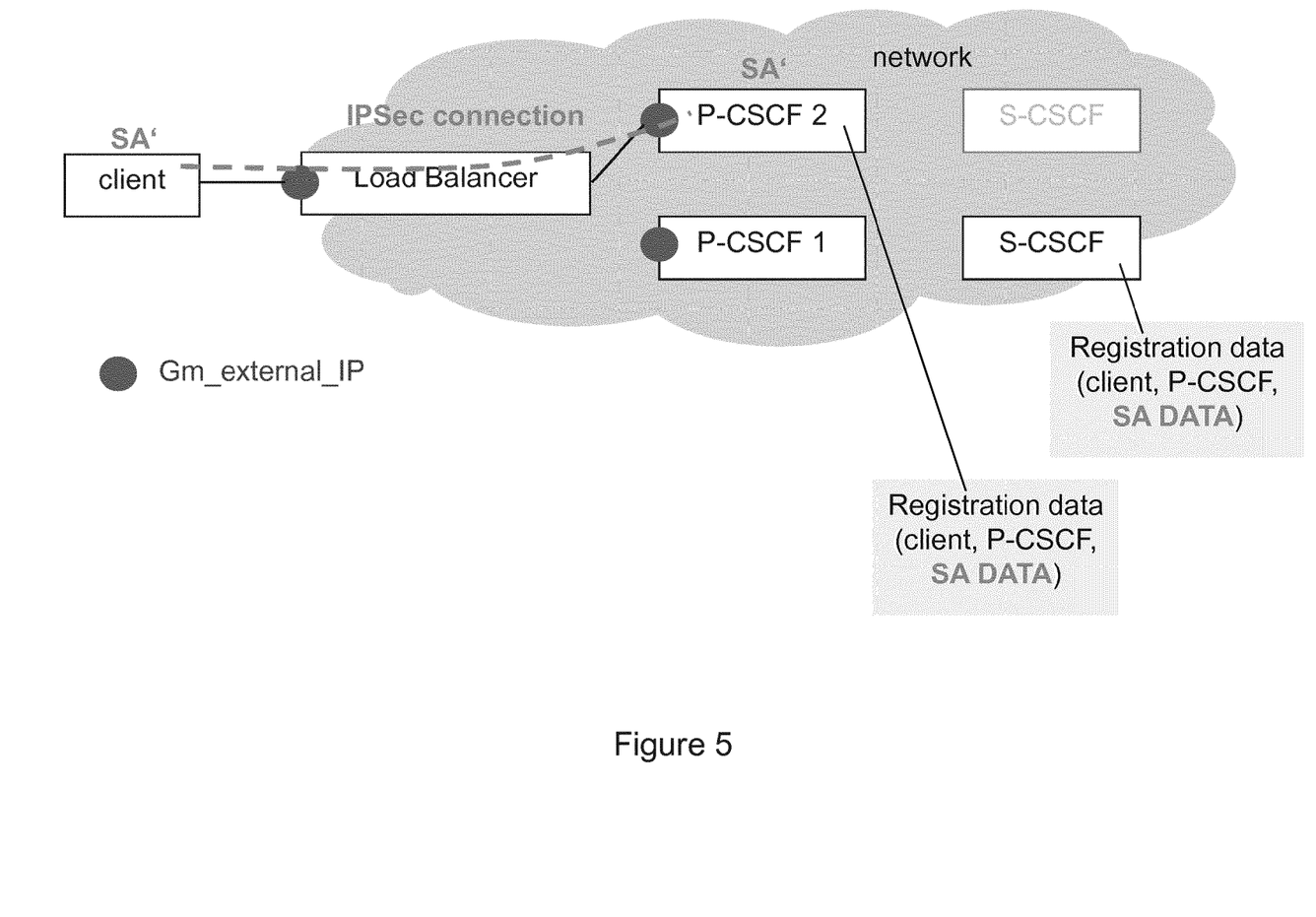
FIG. 5 shows a schematic diagram of a system scenario in connection with establishment of a secured connection for an alternative security association in a procedure according to exemplary embodiments of the present invention.

FIG. 5 shows a schematic diagram of a system scenario in connection with establishment of a secured connection for an alternative security association in a procedure according to exemplary embodiments of the present invention.

More specifically, FIG. 5 shows the final situation resulting from execution of the procedure. The S-CSCF has sent the SA data to the failover P-CSCF 2, and the S-CSCF may keep the SA data locally stored e.g. for future failover cases. This alternative P-CSCF has created an alternative/failover SA with the client for the same IP address (Gm_external_IP) as had been used by the failed P-CSCF 1 at the time of re-/registration. Namely, the P-CSCF 2 uses the thus received SA data in order to create the needed SA for failover purposes. The P-CSCF 2 can then send any data (e.g. relating to the SA and/or a terminating request) towards the client, in the same way as the P-CSCF 1 had done it, only via the newly created alternative/failover SA. Namely, the P-CSCF 2 uses the alternative/failover SA in order to send the terminating request to the client, which has previously been received by the S-CSCF (thus initiating the P-CSCF failure detection operation), and which has subsequently been sent to the P-CSCF 2.

As a result, the client sees no difference, i.e. may not recognize that it is now served by the P-CSCF 2 instead of, i.e. on behalf of, the P-CSCF 1 with which the original SA has been maintained. Therefore, terminating requests destined for the client can also be passed to the client in a situation where the P-CSCF originally involved in the IMS AKA based registration is not available anymore.

In brief, according to exemplary embodiments of the present invention, there is provided a failover functionality for a proxy function, in which a second proxy function steps in on behalf of the first proxy function with respect to a security association for client authentication purposes, when the first proxy function fails.

In view of the above, exemplary embodiments of the present invention provide an improved failover functionality for a client-related security association in terms of response time, i.e. the duration of service interruption after failure of a network element in charge of authentication via a client-related security association. Even if a client-related security association is not available e.g. due to failure of an involved proxy function, any client-destined request or the like may be properly delivered without any (significant) service interruption by way of an alternative/failover client-related security association on behalf of the original security association. Accordingly, failover is provided fast.

Also, failover may be provided only when needed (thus avoiding e.g. registration bursts), when using some appropriate trigger, e.g. receipt of a terminating request for the client at the S-CSCF as exemplified above. When, e.g. by way of a background process, (e.g. all) stored SAs (i.e. SAs relating to stored SA data) are set up at the P-CSCF2, registration bursts can also be avoided. In such case, as an advantage, the client does not need to initiate a new registration procedure in the event that the client is the first one to start network activity after the P-CSCF 1 outage, e.g. the client initiates an original call attempt or the like before a terminating request for the client is received at the S-CSCF.

In view of the above, exemplary embodiments of the present invention provide an failover functionality for a client-related security association, which is based on support by two independent proxy functions and a commonly servicing serving function, and which does not require support or participation of the client. Further, as a failover security association may be rapidly and reliably created when needed, a single security association (i.e. a single registration) is sufficient to be maintained, and no plurality of (backup) security associations (or registrations) need to be set up already before a failure.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 6, while for the sake of brevity reference is made to the detailed description of respective corresponding schemes, methods and functionality, principles and operations according to FIGS. 1 to 5.

Figure 6:
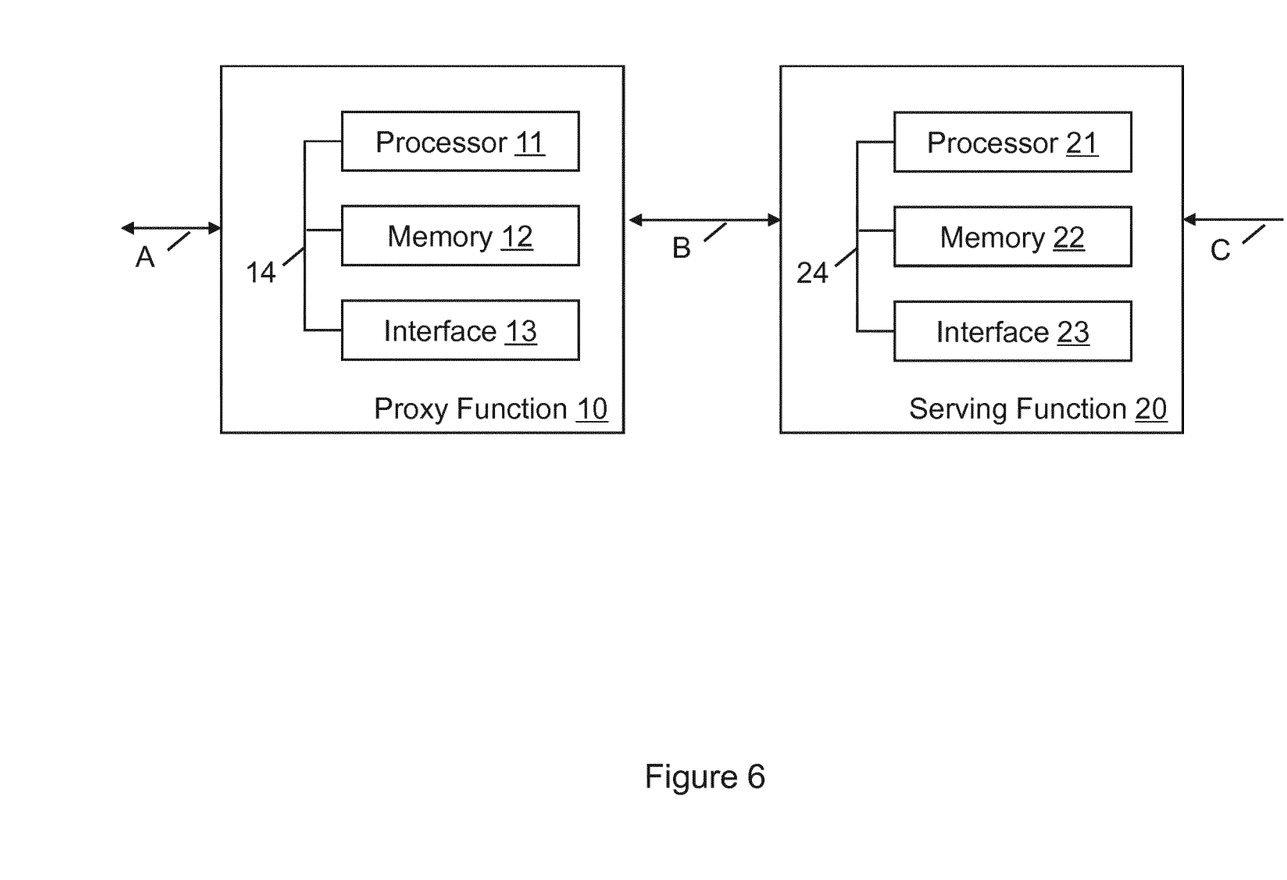
FIG. 6 shows a schematic diagram of exemplary apparatuses according to exemplary embodiments of the present invention.

In FIG. 6 below, the solid line blocks are basically configured to perform respective operations as described above. The entirety of solid line blocks are basically configured to perform the methods and operations as described above, respectively. With respect to FIG. 6, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 6, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 6 shows a schematic diagram of exemplary apparatuses according to exemplary embodiments of the present invention.

In view of the above, the thus illustrated apparatuses 10 and 20 are suitable for use in practicing the exemplary embodiments of the present invention, as described herein.

The thus illustrated apparatus 10 may represent a (part of a) proxy function according to exemplary embodiments of the present invention, and may be configured to perform a procedure and/or exhibit a functionality as described in connection with P-CSCF 1 and P-CSCF 2 in any one of FIGS. 1 to 5. The thus illustrated apparatus 20 may represent a (part of a) serving function according to exemplary embodiments of the present invention, and may be configured to perform a procedure and/or exhibit a functionality as described in connection with S-CSCF in any one of FIGS. 1 to 5.

In particular, the apparatus 10 in FIG. 6 may represent either the P-CSCF 1 or the P-CSCF 2, or a combination of both P-CSCFs, or a combination of both P-CSCFs as well as the load balancer. In the first alternative, the apparatus 10 may for example be realized by a standalone network element, a blade in an ATCA-type apparatus, or the like. In the second alternative, the apparatus 10 may for example be realized by two blades in an ATCA-type apparatus, an ATCA-type apparatus with two blades, each blade realizing one of the two P-CSCFs, or the like. In the third alternative, the apparatus 10 may for example be realized by a virtual network element (e.g. a large, scalable virtual P-CSCF comprising a number of real P-CSCF entities/apparatuses) or the like.

Although not illustrated, a load balancer according to exemplary embodiments of the present invention has a similar structure as that of the apparatuses 10 and 20 shown in FIG. 6.

Any one of the thus illustrated apparatuses 10 and 20, as well as their architectural relationship and/or system-related interrelation, may be configured as depicted in any one of FIGS. 1 to 5. A combination of apparatuses 10 and 20 may constitute a system according to exemplary embodiments of the present invention.

As indicated in FIG. 6, according to exemplary embodiments of the present invention, each of the apparatuses 10/20 comprises a processor 11/21, a memory 12/22 and an interface 13/23, which are connected by a bus 14/24 or the like. The apparatuses 10 and 20 may be connected via a link B, the apparatus 10 may be connected with a client and/or a load balancer via a link A, and the apparatus 20 may be connected with a network element in a backbone or transport network via a link C.

The processor 11/21 and/or the interface 13/23 may also include a modem or the like to facilitate communication over a (hardwire or wireless) link, respectively. The interface 13/23 may include a suitable transceiver coupled to one or more antennas or communication means for (hardwire or wireless) communications with the linked or connected device(s), respectively. The interface 13/23 is generally configured to communicate with at least one other apparatus, i.e. the interface thereof.

The memory 12/22 may store respective programs assumed to include program instructions or computer program code that, when executed by the respective processor, enables the respective electronic device or apparatus to operate in accordance with the exemplary embodiments of the present invention. For example, the memory 12/22 may also store the SA data (possibly together with registration data), as outlined above.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "processor configured to [cause the apparatus to] perform xxx-ing" is construed to be equivalent to an expression such as "means for xxx-ing").

In its most basic form, according to exemplary embodiments of the present invention, the apparatus 10 or its processor 11 is configured to perform providing a failover functionality for a first proxy function in cooperation with a serving function configured for servicing the first proxy function and a second proxy function, wherein the first proxy function has (or is involved in) a security association with a client, and the first proxy function and the second proxy function are reachable with (or exhibit) the same network address.

Accordingly, stated in other words, the apparatus 10 may comprise respective means for providing a failover functionality for a first proxy function in cooperation with a serving function.

When the apparatus 10 involves operability of/as the first proxy function, the apparatus 10 or its processor 11 is further configured to perform at least sending data of the security association or data of the security association together with data of a registration of the client to the serving function upon registering or re-registering the client at the first proxy function.

When the apparatus 10 involves operability of/as the second proxy function, the apparatus 10 or its processor 11 is further configured to perform at least receiving data of the security association or data of the security association together with data of a registration of the client from the serving function, and creating an alternative security association with the client on the basis of the received data. As mentioned above, the thus created alternative security association is to replace the security association between the first proxy function and the client.

In its most basic form, according to exemplary embodiments of the present invention, the apparatus 20 or its processor 21 is configured to perform facilitating provision of a failover functionality for a first proxy function in cooperation with the first proxy function and a second proxy function at a serving function configured for servicing the first proxy function and the second proxy function, wherein the first proxy function has (or is involved in) a security association with a client, and the first proxy function and the second proxy function are reachable with (or exhibit) the same network address.

Accordingly, stated in other words, the apparatus 20 may comprise respective means for facilitating provision of a failover functionality for a first proxy function in cooperation with the first proxy function and a second proxy function.

In terms of facilitating provision of a failover functionality for a first proxy function in cooperation with the first proxy function and a second proxy function, the apparatus 20 or its processor 21 may be further configured to perform receiving data of the security association or data of the security association together with data of a registration of the client from the first proxy function, and storing the received data for a registration period of the client. Also, the apparatus 20 or its processor 21 may be further configured to perform detecting a failure of the first proxy function, selecting the second proxy function as a failover proxy function for the failed first proxy function, and sending the received data to the second proxy function.

In its most basic form, according to exemplary embodiments of the present invention, an apparatus representing/realizing a load balancer or its processor is configured to perform supporting provision of a failover functionality for a first proxy function in cooperation with a second proxy function, wherein the first proxy function has (or is involved in) a security association with a client, and the first proxy function and the second proxy function are reachable with (or exhibit) the same network address.

Accordingly, stated in other words, an apparatus representing/realizing a load balancer may comprise respective means for supporting provision of a failover functionality for a first proxy function in cooperation a second proxy function.

In terms of supporting provision of a failover functionality for a first proxy function in cooperation with a second proxy function, the apparatus representing/realizing a load balancer or its processor may be further configured to enable the client to use/recognize or listen to a single network address for/in communication (including creation/refreshing of a security association) with the load balancer, the first proxy function and the second proxy function. Accordingly, the apparatus representing/realizing a load balancer or its processor may be configured to perform relaying of messages, data and the like (e.g. on a secured connection and/or via a security association) between the client and any one of the first and second proxy functions. That is, when receiving a message or the like with a destination being defined by the common network address, the load balancer as such decides the actual function or network element (out of all functions or network elements exhibiting the same network address) to which this message or the like is to be relayed or routed. Thereby, the apparatus representing/realizing a load balancer or its processor may realize a single/common entry/access/gateway point between the client and the proxy functions.

For further details regarding the operability/functionality of the individual apparatuses, reference is made to the abode description in connection with any one of FIGS. 1 to 5, respectively.

According to exemplarily embodiments of the present invention, the processor 11/21, the memory 12/22 and the interface 13/23 may be implemented as individual modules, chips, chipsets, circuitries or the like, or one or more of them can be implemented as a common module, chip, chipset, circuitry or the like, respectively.

According to exemplarily embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for a failover functionality for a client-related security association. Such measures exemplarily comprise providing a failover functionality at a proxy function and/or facilitating provision of a failover functionality at a servicing call state control function, wherein the respective failover functionality relates to a first proxy function, the serving function is for servicing the first proxy function and a second proxy function, the first proxy function has a security association with a client, and the first proxy function and the second proxy function are reachable with the same network address.

The measures according to exemplary embodiments of the present invention may be applied for any kind of network environment, such as for example for fixed communication systems e.g. in accordance with any related IEEE/IETF standard and/or mobile communication systems e.g. in accordance with any related standards of 3GPP and/or 3GPP2, and so on, e.g. UMTS standards and/or HSPA standards and/or LTE standards (including LTE-Advanced and its evolutions) and/or WCDMA standards.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Program
AKA Authentication and Key Agreement
ATCA Advanced Telecommunications Computing Architecture
CSCF Call State Control Function
HSPA High Speed Packet Access
IEEE Institute of Electrical and Electronics Engineer
IETF Internet Engineering Task Force
IMS IP Multimedia Subsystem
IP Internet Protocol
LTE Long Term Evolution
P-CSCF Proxy-CSCF
S-CSCF Serving-CSCF
SA Security Association
SIP Session Initiation Protocol
SPI Security Parameter Index
UE User Equipment
UMTS Universal Mobile Telecommunications System
UTRAN Universal Terrestrial Radio Access Network
WCDMA Wideband Code Division Multiple Access

The invention claimed is:

1. A method comprising
providing a failover functionality for a first proxy function in cooperation with a serving function configured for servicing the first proxy function and a second proxy function, wherein the first proxy function has a security association with a client, and the first proxy function and the second proxy function are reachable with the same network address,
wherein providing the failover functionality comprises
sending data of the security association or data of the security association together with data of a registration of the client from the first proxy function to the serving function upon registering or re-registering the client at the first proxy function.

2. The method according to claim 1, wherein providing the failover functionality further comprises
receiving a registration message of the client via a load balancer entity at the first proxy function, wherein
the load balancer entity is configured for servicing the first proxy function and the second proxy function, and
the load balancer entity exhibits the same network address as the first proxy function and the second proxy function towards the client.

3. The method according to claim 1, wherein
the security association is established on an IPSec connection between the first proxy function and the client, and/or
the security association is associated with an authentication of the client at the first proxy function on the basis of authentication and key agreement, and/or
the data of the security association or the data of the security association together with the data of a registration of the client is sent in a registration message and/or a session initiation protocol message or a header thereof.

4. A method, comprising
providing a failover functionality for a first proxy function in cooperation with a serving function configured for servicing the first proxy function and a second proxy function, wherein the first proxy function has a security association with a client, and the first proxy function and the second proxy function are reachable with the same network address,
wherein providing the failover functionality comprises
receiving data of the security association or data of the security association together with data of a registration of the client from the serving function at the second proxy function, and
creating an alternative security association between the second proxy function and the client on the basis of the received data.

5. The method according to claim 4, wherein
the receiving further comprises receiving a request according to a request message destined for the client.

6. The method according to claim 4, wherein providing the failover functionality further comprises
sending a request message towards the client via a load balancer entity, wherein
the load balancer entity is configured for servicing the first proxy function and the second proxy function, and
the load balancer entity exhibits the same network address as the first proxy function and the second proxy function towards the client.

7. The method according to claim 4, wherein
the alternative security association is established on an IPSec connection between the second proxy function and the client, and/or
the security association is associated with an authentication of the client at the second proxy function on the basis of authentication and key agreement, and/or
the data of the security association or the data of the security association together with the data of a registration of the client is received in a request message and/or a session initiation protocol message or a header thereof.

8. The method according to claim 1, wherein
the method is operable at or by a network element configured to realize a proxy function, and/or
the method is operable in a network based on an IP multimedia subsystem or a session initiation protocol, and/or
the first and/or second proxy function represents a proxy call state control function, and/or
the serving function represents a serving call state control function.

9. A method comprising
facilitating provision of a failover functionality for a first proxy function in cooperation with the first proxy function and a second proxy function at a serving function configured for servicing the first proxy function and the second proxy function, wherein the first proxy function has a security association with a client, and the first proxy function and the second proxy function are reachable with the same network address,
wherein facilitating provision of the failover functionality comprises
receiving data of the security association or data of the security association together with data of a registration of the client from the first proxy function at the serving function, and storing the received data for a registration period of the client.

10. The method according to claim 9, wherein facilitating provision of the failover functionality further comprises
detecting a failure of the first proxy function at the serving function,
selecting the second proxy function as a failover proxy function for the failed first proxy function, and
sending the received data from the serving function to the second proxy function.

11. The method according to claim 9, wherein
a detecting operation for detecting a failure of the first proxy function is performed upon receiving a request message destined for the client, and/or
the sending further comprises sending a request according to the received request message.

12. The method according to claim 9, wherein
the security association is associated with an authentication of the client at the first proxy function on the basis of authentication and key agreement, and/or
said data is received from the first proxy function in a registration message and/or a session initiation protocol message or a header thereof, and/or
said data is sent to the second proxy function in a request message and/or a session initiation protocol message or a header thereof.

13. The method according to claim 9, wherein
the method is operable at or by a network element configured to realize a serving function, and/or
the method is operable in a network based on an IP multimedia subsystem or a session initiation protocol, and/or
the first and/or second proxy function represents a proxy call state control function, and/or
the serving function represents a serving call state control function.

14. An apparatus comprising
an interface configured to communicate with at least another apparatus,
a memory configured to store computer program code, and
a processor configured to cause the apparatus to perform:
providing a failover functionality for a first proxy function in cooperation with a serving function configured for servicing the first proxy function and a second proxy function, wherein the first proxy function has a security association with a client, and the first proxy function and the second proxy function are reachable with the same network address,
wherein the processor is configured to cause the apparatus to perform for providing the failover functionality:
sending data of the security association or data of the security association together with data of a registration of the client to the serving function upon registering or re-registering the client at the first proxy function.

15. The apparatus according to claim 14, wherein the processor is configured to cause the apparatus to further perform for providing the failover functionality:
receiving a registration message of the client via a load balancer entity, wherein
the load balancer entity is configured for servicing the first proxy function and the second proxy function, and
the load balancer entity exhibits the same network address as the first proxy function and the second proxy function towards the client.

16. The apparatus according to claim 14, wherein
the security association is established on an IPSec connection between the first proxy function and the client, and/or the security association is associated with an authentication of the client at the first proxy function on the basis of authentication and key agreement, and/or
the processor is configured to cause the apparatus to send the data of the security association or the data of the security association together with the data of a registration of the client in a registration message and/or a session initiation protocol message or a header thereof.

17. An apparatus comprising
an interface configured to communicate with at least another apparatus,
a memory configured to store computer program code, and
a processor configured to cause the apparatus to perform:
providing a failover functionality for a first proxy function in cooperation with a serving function configured for servicing the first proxy function and a second proxy function, wherein the first proxy function has a security association with a client, and the first proxy function and the second proxy function are reachable with the same network address,
wherein the processor is configured to cause the apparatus to perform for providing the failover functionality:
receiving data of the security association or data of the security association together with data of a registration of the client from the serving function, and
creating an alternative security association with the client on the basis of the received data.

18. The apparatus according to claim 17, wherein
the processor is configured to cause the apparatus to further perform, in the receiving, receiving a request according to a request message destined for the client.

19. The apparatus according to claim 17, wherein the processor is configured to cause the apparatus to perform for providing the failover functionality:
sending a request message towards the client via a load balancer entity, wherein
the load balancer entity is configured for servicing the first proxy function and the second proxy function, and
the load balancer entity exhibits the same network address as the first proxy function and the second proxy function towards the client.

20. The apparatus according to claim 17, wherein
the alternative security association is established on an IPSec connection between the second proxy function and the client, and/or
the security association is associated with an authentication of the client at the second proxy function on the basis of authentication and key agreement, and/or
the processor is configured to cause the apparatus to receive the data of the security association or the data of the security association together with the data of a registration of the client in a request message and/or a session initiation protocol message or a header thereof.

21. The apparatus according to claim 14, wherein
the apparatus is operable as or at a network element configured to realize a proxy function, and/or
the apparatus comprises the first and second proxy functions in an advanced telecommunications computing architecture or as a virtual network element,
the apparatus is operable in a network based on an IP multimedia subsystem or a session initiation protocol, and/or
the first and/or second proxy function represents a proxy call state control function, and/or
the serving function represents a serving call state control function.

22. An apparatus comprising
an interface configured to communicate with at least another apparatus,
a memory configured to store computer program code, and
a processor configured to cause the apparatus to perform:
facilitating provision of a failover functionality for a first proxy function in cooperation with the first proxy function and a second proxy function at a serving function configured for servicing the first proxy function and the second proxy function, wherein the first proxy function has a security association with a client, and the first proxy function and the second proxy function are reachable with the same network address,
wherein the processor is configured to cause the apparatus to perform for facilitating provision of the failover functionality:
receiving data of the security association or data of the security association together with data of a registration of the client from the first proxy function, and
storing the received data for a registration period of the client.

23. The apparatus according to claim 22, wherein the processor is configured to cause the apparatus to further perform for facilitating provision of the failover functionality:
detecting a failure of the first proxy function,
selecting the second proxy function as a failover proxy function for the failed first proxy function, and
sending the received data to the second proxy function.

24. The apparatus according to claim 22, wherein the processor is configured such that:
a detecting operation for detecting a failure of the first proxy function is performed upon receiving a request message destined for the client, and/or
the sending further comprises sending a request according to the received request message.

25. The apparatus according to claim 22, wherein
the security association is associated with an authentication of the client at the first proxy function on the basis of authentication and key agreement, and/or
the processor is configured to cause the apparatus to receive said data from the first proxy function in a registration message and/or a session initiation protocol message or a header thereof, and/or
the processor is configured to cause the apparatus to send said data to the second proxy function in a request message and/or a session initiation protocol message or a header thereof.

26. The apparatus according to claim 22, wherein
the apparatus is operable as or at a network element configured to realize a serving function, and/or
the apparatus is operable in a network based on an IP multimedia subsystem or a session initiation protocol, and/or
the first and/or second proxy function represents a proxy call state control function, and/or
the serving function represents a serving call state control function.

27. A computer program product embodied on a non-transitory computer-readable medium comprising computer-executable computer program code which, when the program is run on a computer, is configured to cause the computer to carry out the method according to claim 1.

28. A computer program product embodied on a non-transitory computer-readable medium comprising computer-executable computer program code which, when the program is run on a computer, is configured to cause the computer to carry out the method according to claim 9.

* * * * *